Nov. 21, 1967 C. F. RIVERS 3,353,420

DRIVE TIGHTENER

Filed July 12, 1965

INVENTOR.
CHARLES F. RIVERS
BY
Whittemore, Hulbert & Belknap
ATTORNEYS

United States Patent Office 3,353,420
Patented Nov. 21, 1967

3,353,420
DRIVE TIGHTENER
Charles F. Rivers, 15318 Warwick,
Detroit, Mich. 48223
Filed July 12, 1965, Ser. No. 470,965
4 Claims. (Cl. 74—242.1)

ABSTRACT OF THE DISCLOSURE

The invention relates to a drive tightener comprising an arm pivoted at one end on a base, and a rotatable member pivoted on the opposite end of the arm and adapted to engage a flexible linear member to tighten the same. Means are provided for adjusting the angular position of the arm comprising a bolt assembly pivoted to the arm and adapted to extend through a hole in either one of the two flanges provided along opposite sides of the base. Means are provided for securing the arm in adjusted angular position comprising a bolt assembly extending through an arcuate slot in the base.

---

One of the objects of the invention is to provide a drive tightener which can be accurately and easily adjusted.

Another object of the invention is to provide a drive tightener which is capable of either right-hand or left-hand operation.

Another object is to provide a drive tightener which is adapted for either right-hand or left-hand use by merely reversing the adjusting bolt.

Another object is to provide a drive tightener which is particularly designed for use on heavy loads.

Another object is to provide a drive tightener of sturdy construction in which the parts will not vibrate loose in operation.

Another object is to provide a drive tightener having an adjusting arm which is supported for substantially its full length to prevent bending under heavy loads.

Another object is to provide a drive tightener of exceedingly simple and low cost construction.

Another object is to provide a drive tightener comprising an arm pivoted on a base, a rotatable member mounted on the arm and adapted to engage a flexible linear drive member to tighten the same, and means for adjusting the angular position of the arm comprising a bolt connected to and extending laterally from the arm in the plane of pivotal movement thereof, and a nut threaded on the bolt.

Another object is to provide a drive tightener in which the adjusting bolt can be reversed so as to extend laterally from the arm in the opposite direction so that the adjusting bolt will be in tension whether the drive tightener is used for right-hand or left-hand operation.

Other objects and features of the invention will become apparent as the description proceeds, especially when taken in conjunction with the accompanying drawings, wherein.

Figure 1:
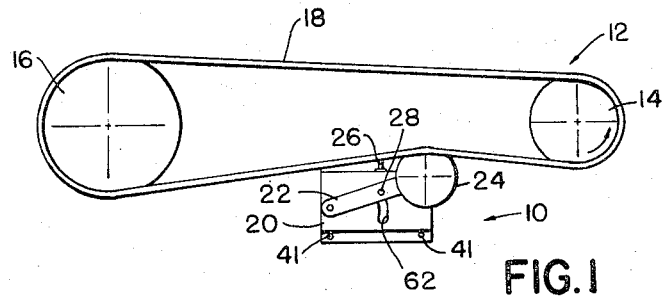
FIGURE 1 is a semi-diagrammatic view of a drive tightener embodying my invention shown in association with a suitable drive.

Referring now more particularly to the drawing, the drive tightener is generally indicated by the reference numeral 10 and is shown in FIGURE 1 in operative relation to a suitable drive generally designated 12. In the present instance the drive 12 is shown as comprising the spaced gears 14 and 16, and a flexible linear element in the form of a chain 18 extends over the gears. The gear 14 is the driving gear and is adapted to be rotated by a suitable source of power in the direction of the arrow.

The drive tightener comprises a base 20, a lever arm 22 pivoted on the base, a rotatable member 24 on the arm, an adjusting nut and bolt assembly 26, and a locking or clamping nut and bolt assembly 28.

Figure 3:
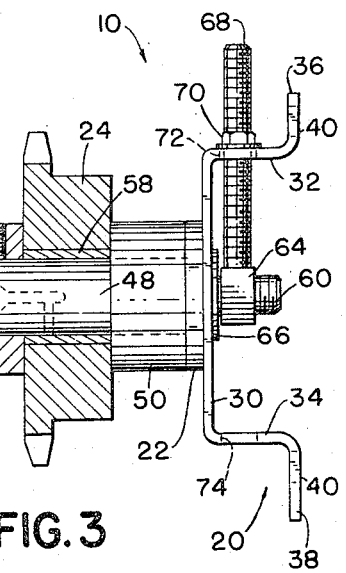
FIGURE 3 is an end view of the structure shown in FIGURE 2, with parts in section.

The base 20 is in the form of a plate preferably of a strong steel construction and has a flat rectangular mounting portion 30 with spaced parallel flanges 32 and 34 along the opposite longitudinal edges of the mounting portion 30. The flanges 32 and 34 are preferably at right angles to the mounting portion 30. The mounting portion and the flanges 32 and 34 define a channel or U-shape as best shown in FIGURE 3. A pair of mounting flanges 36 and 38 are turned outwardly from the ends of the flanges 32 and 34 and are disposed in the same plane. These mounting flanges 36 and 38 have holes 40 through which fasteners 41 may extend to mount the base on a fixed supporting surface.

The lever arm 22 is in the form of a long flat plate preferably of sturdy steel construction. One end of the arm 22 is pivoted to the mounting portion 30 of the base at one end of the mounting portion and preferably midway between the opposite sides thereof. The pivotal mounting for the arm comprises the bolt 42 which extends through aligned holes in the arm and in the mounting portion 30 of the base, and a nut 44 threaded on the bolt. A washer 46 may also be employed.

Figure 4:
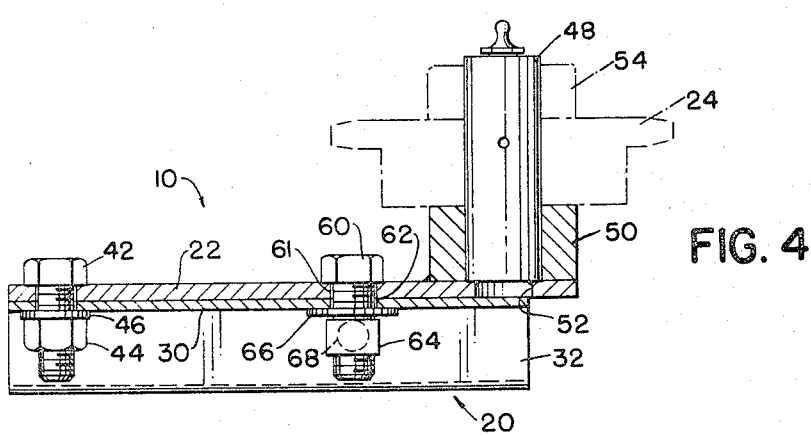
FIGURE 4 is a sectional view taken on the line 4—4 of FIGURE 2.

The rotatable member 24 is in the form of a gear so as to mesh with the chain 18. Obviously if instead of a chain the flexible linear drive element 18 were a belt, then a pulley could be substituted for the gear 24. The gear 24 is mounted on the free or swinging end of the arm 22 on a shaft 48. As shown particularly in FIGURE 4, a ring-shaped boss 50 is welded onto the free end of the arm, and the shaft 48 has a press fit in the boss. The free end of the arm also preferably has a hole 52 opposite the end of the shaft 48 so that a weld may be provided between the shaft and the arm as shown in FIGURE 4. A gear retainer 54 is sleeved on the end of the shaft 48 and secured thereto by a set screw 56. Together the retainer 54 and the boss 50 confine the gear 24, but permit it to rotate freely on the bushing 58. The shaft 48 extends parallel to the bolt 42 on which the arm 22 pivots.

It will be noted that the arm 22 lies flat against the surface of the mounting portion 30 throughout substantially its full length. This provides a full support for the arm and prevents it from bending or twisting under heavy loads.

The clamping or locking nut and bolt assembly 28 comprises a bolt 60 which extends through a hole 61 in the arm and through an arcuate slot 62 in the mounting portion 30 of the base. The slot 62 is curved on a radius centered at the axis of the pivot bolt 42. The locking nut and bolt assembly 28 also includes the nut 64 threaded on the end of the bolt. A washer 66 may also be employed.

The adjusting nut and bolt assembly 26 includes the bolt 68 which has one end permanently secured as by welding to the nut 64, and it also includes the nut 70. The adjusting bolt 68 is adapted to extend to one side or the other of the lever arm 22 and to project through the hole 72 in flange 32 of the base or through hole 74 in the flange 34.

Figure 2:
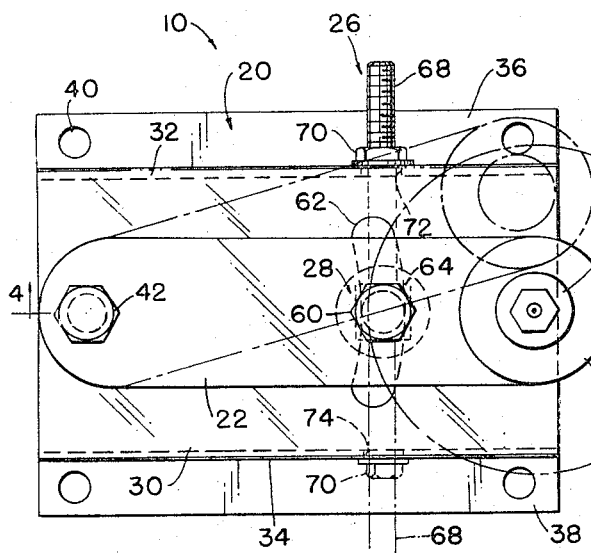
FIGURE 2 is an enlarged plan view of the drive tightener shown in FIGURE 1.

In use, the belt tightener will be securely mounted in position adjacent one run of the drive chain 18 by fasteners 41 inserted through holes 40 in the mounting flanges 36 and 38 of the base. The arm 22 will then be adjusted angularly to press the gear 24 against chain 18 with sufficient force to achieve the desired amount of tightening. This will be accomplished by rotation of the nut 70 of the adjusting nut and bolt assembly 26 to move the arm 22 counterclockwise in FIGURES 1 and 2. Preferably the adjusting bolt 68 will extend upward from the arm 22 as indicated in FIGURES 1 and 2, through hole 72 in flange 32 so that when suitably tightened the bolt 68 will be in tension. The nut 70 will of course bear against the outer side of flange 32. After the arm 22 has been adjusted angularly by the nut and bolt assembly 26, the clamping or locking assembly 28 may be tightened up to secure the adjustment of the arm with respect to the base and thereby take some of the load off of the adjusting nut and bolt assembly 26. This may be accomplished by applying a wrench to the head of the clamping bolt 60 and rotating it relative to nut 64 which is held from rotation by bolt 68.

If it should be desired to turn the drive tightener 180° from the position shown in FIGURE 1 for right-hand rather than left-hand operation, the adjusting nut and bolt assembly 26 may be reversed 180° to the dotted line position of FIGURE 2 so that the bolt 68 extends through the hole 74 in flange 34. The unt 70 would then be applied to the free end of the bolt 68 and could be taken up the necessary amount to apply the desired amount of tightening. The nut 70 would of course bear against the outer side of flange 34, and bolt 68 would be in tension.

While it is preferable to swing the adjusting bolt 68 to one side or the other so that the adjusting bolt will be in tension whether the drive tightener is used in a right-hand or a left-hand operation, it will be understood that the device may be employed in a manner such that the adjusting bolt 68 will be in compression. In other words, referring to FIGURE 1, the adjusting bolt 68 could be swung around 180° so as to extend through the hole in the flange 34, or downwardly in FIGURE 1. In that event, the nut 70 would have to be threaded onto the bolt 68 down near the nut 64 before the bolt was inserted through the hole 74 in flange 34, so that when adjusted the nut 70 would bear against the inner side of flange 34 rather than against the outer side as it normally does when the bolt 68 operates in tension.

The slot 62 may be long enough to permit the removal of the adjusting bolt 68 from the hole in either flange 32 or 34 without removal of the clamping nut and bolt assembly 28. However, in some instances, and in accordance with the construction shown in the drawings, it may be desirable either to employ a shorter slot 62 or a longer bolt 68 so that the bolt cannot be removed from the hole in flange 32 or 34 without removing the nut and bolt assembly 28 to permit the arm 22 to swing beyond the end of the slot. As a result, the bolt 68 would be prevented from being accidently withdrawn from the hole in either flange 32 or 34.

Preferably the drive tightener is of all steel construction so as to be capable of effective use under heavy loads. The construction and design of the drive tightener is such that it may even be used on the drive or tight side of the chain, As seen in FIGURE 1 the device is employed on the drive side, the upper run of the chain 18 being the slack side.

It will also be seen that the drive tightener can be readily adjusted for either right-hand or left-hand operation by merely reversing the adjusting bolt 68. The drive tightener is not only simple in construction but capable of being made inexpensively. The fact that the adjusting arm 22 slides flat against the mounting portion 30 of the base throughout substantially its full length prevents any tendency of the arm to bend or twist under heavy loads.

What I claim as my invention is:

1. A drive tightener comprising a base plate having a flat mounting portion and laterally spaced flanges projecting to one side of said mounting portion along the opposite edges of the latter, each flange having a hole therein, said mounting portion and flanges defining a U-shaped cross-section, a lever arm pivoted on the opposite side of said mounting portion, said arm sliding flat against the said opposite side of said mounting portion during angular movement thereof so as to be supported by said mounting portion and to resist bending of said arm, a rotatable member mounted on the opposite end of said arm and adapted to engage a flexible linear element to tighten the same, means for adjusting the angular position of said arm, said mounting portion having an arcuate slot between said flanges centered on the axis of pivotal movement of said arm, a clamping nut and bolt assembly including a bolt perpendicular to the plane of movement of said arm extending through said arm and through said slot, a nut threaded on said bolt on the said one side of said mounting portion and adapted to be tightened to secure the adjustment of said arm, said adjusting means including a second bolt secured to said nut so as to be rotatable therewith, said second bolt being adapted to extend through the hole in one flange or the other, and a second nut threaded on said second bolt and adapted to bear against one flange or the other on the side thereof away from said arm.

2. The drive tightener defined in claim 1, wherein said arm has a ring-shaped boss on said opposite end, and a shaft having a press fit in said boss and welded to said arm, said rotatable member being carried by said shaft.

3. A drive tightener comprising a base, a lever arm pivoted at one end to said base, a rotatable member mounted on the opposite end of said arm and adapted to engage a flexible linear member to tighten the same, and means for adjusting the angular position of said arm comprising a bolt pivoted to said arm on an axis pependicular to the plane of pivotal movement of said arm, said base having flanges on opposite sides of said arm and each having a hole, said bolt being adapted to extend through the hole in one flange or the other, a nut threaded on said bolt and adapted to bear against one flange or the other on the side thereof away from said arm, said base having an arcuate slot between said flanges centered on the axis of pivotal movement of said arm, and a nut and bolt assembly extending through said arm and through said slot to secure the adjustment of said arm when tightened, said first-mentioned bolt being connected to said nut and bolt assembly.

4. A drive tightener comprising a base, said base having a flat plate portion and flanges extending along opposite edges of and substantially at right angles to said plate portion, each flange having a hole, said plate portion and flanges being of generally channel form in cross-section, to lever arm pivoted at one end to said plate portion intermediate said opposite edges thereof, a rotatable member mounted on the opposite end of said arm and adapted to engage a flexible linear member to tighten the same, and means for adjusting the angular position of said arm comprising a bolt pivoted to said arm on an axis perpendicular to the plane of pivotal movement of said arm, said bolt being adapted to extend through the hole in one flange or the other, and a nut threaded on said bolt and adapted to bear against one flange or the other.

References Cited
UNITED STATES PATENTS

| | | | |
|---|---|---|---|
| 315,202 | 4/1885 | Willford | 74—242.11 |
| 598,658 | 2/1898 | Gilman | 74—242.11 |
| 825,645 | 7/1906 | Gaum | 74—242.11 |
| 1,319,122 | 10/1919 | Shelton | 74—242.1 |
| 1,787,514 | 1/1931 | Dean et al. | 74—242.1 |
| 2,985,027 | 5/1961 | Murray | 74—242.1 |
| 3,071,980 | 1/1963 | Brewer | 74—242.1 |

FRED C. MATTERN, JR., *Primary Examiner.*

J. A. WONG, *Assistant Examiner.*